Patented Dec. 12, 1933

1,938,963

UNITED STATES PATENT OFFICE 1,938,963

PRODUCTION OF GREEN SULPHUR DYES

Raymond W. Hess and Maurice Henry Fleysher, Buffalo, N. Y., assignors to National Aniline & Chemical Company, Inc., New York, N. Y., a corporation of New York No Drawing. Application March 28, 1929
Serial No. 350,803

9 Claims. (Cl. 260—19)

This invention relates to improvements in the production of green sulphur dyes from indophenols of the following probable general formula:

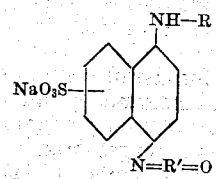

wherein R represents an aryl residue of the benzene series, such as phenyl or its homologues, particularly those free from a substituent, and R' represents a phenylene residue which may contain substituents. The dyestuffs are prepared by sulphurizing the respective indophenol in a polysulphide melt. The invention also includes improvements in the method of preparing the indophenols, and improvements in the method of isolating the sulphur dye from its polysulphide melt, as will be hereinafter described.

According to one method of the prior art (D. R. P. 162,156, Frdl. VIII, 767; D. R. P. 132,212, Frdl. VI, 676), the indophenols may be prepared by adding an aqueous solution of sodium hypochlorite to an equimolecular mixture of p-aminophenol and a phenylaminonaphthalene sulphonic acid in alkaline solution, the reaction being carried out at a temperature of 5° C. The indophenol is converted into the corresponding dye by sulphurizing it at a temperature of 120° C. with a polysulphide, 4.1 mols of Na$_2$S$_4$ per mol of indophenol being employed. The resulting dye is then isolated by dissolving the melt in water, and salting out the dye from the solution by the addition of common salt.

This process has several disadvantages. Among them is the low overall yield of dyestuff obtained. The low overall yield is a summation of low yields obtained in the process of producing the indophenol, the process of sulphuration, and the process of isolating the dye from the melt.

Thus, a good yield of the dye is not obtained by salting out the dyestuff from its melt as above described. The product precipitated by salting out appears to be of a colloidal nature, difficult to filter, and although fairly pure, the yield is low. If instead of salting out, it is attempted to precipitate the dyestuff by aerating the dissolved melt, the product obtained is contaminated with by-products, produced in prior operations, which are precipitated along with the dyestuff, and which cause dullness of shade in the dyeings. While the exact nature of these impurities is not known, it is believed that they are introduced into the reaction during the step of making the indophenol.

A low yield is also obtained in the sulphurizing step, by carrying out the sulphuration according to the prior art, and there is the further disadvantage incidental to foaming which occurs. A low yield also results in carrying out the prior art method of producing the indophenol. It is therefore the object of this invention to increase the overall yield of dye.

According to one feature of the present invention, the dyestuff is isolated from its melt by saturating the dissolved melt with salt, and aerating the mixture. Another feature of the invention is the use in the sulphurizing step of a polysulphide of higher sulphur content than Na$_2$S$_4$. Still another feature of the invention is the use of about 6.2 mols of Na$_2$S$_5$, together with 0.65 mols of copper salt per mol of indophenol, in the sulphurizing step. Still another feature of the invention is the simultaneous addition of sodium hypochlorite solution and p-aminophenol solution to the solution of arylaminonaphthalene sulphonic acid in the production of the indophenol.

By carrying out the precipitation according to the present invention, the yield of dyestuff is increased over that obtained when the product is salted out. Moreover, the quantity of by-products contaminating the product is less than that which is present when the dyestuff is precipitated by aeration alone. In carrying out the sulphuration by the use of a polysulphide higher than Na$_2$S$_4$, foaming during sulphuration is reduced or eliminated, the time cycle of the operation is shortened and the yield of dyestuff is increased, the dyeings therefrom also being of a brighter shade. Since the shades of the dyeings become bluer the higher the polysulphide used in the fusion, the tendency to blueness is offset by the addition of a copper salt to the melt. By increasing the quantities of copper salt added to the melt the shades of the dyeings become progressively yellower.

The simultaneous addition of the hypochlorite solution and p-aminophenol hydrochloride solution to the alkaline solution of arylaminonaphthalene sulphonic acid results in an increased yield of indophenol. Preferably, the quantity of hypochlorite added to the alkaline solution wherein the condensation takes place is maintained in slight excess over the p-aminophenol hydrochloride added.

The following examples are given to illustrate the invention. The parts are by weight.

*Example 1*.—27.3 parts p-aminophenol is dissolved in 40.6 parts 20° Bé. hydrochloric acid diluted with 150 parts water, warming being resorted to to aid solution. Insoluble matter is filtered off and caustic soda is added to neutralize the excess acid.

A hypochlorite solution is prepared containing an amount of sodium hypochlorite equivalent to 8 parts oxygen in 250 parts water.

A paste containing 80.3 parts of the sodium salt of phenyl-peri acid (1-phenylaminonaphthalene-8-sulphonic acid) is dissolved in about 1000 parts water, dissolution being aided by warming, and the resulting solution is introduced into an oxidation tank equipped with an agitator. The tank is surrounded by ice or other cooling medium. 44.6 parts of 45 per cent caustic soda liquid and about 2000 parts ice are then added. Vigorous agitation is begun and is maintained throughout the reaction.

When the temperature of this mixture reaches a temperature of 0° C., the p-aminophenol hydrochloride solution and the hypochlorite solution are simultaneously introduced in a thin stream over a period of about ½ hour, the quantity of hypochlorite added to the reaction being maintained in slight excess over the p-aminophenol hydrochloride added. Throughout the reaction the temperature should not be permitted to rise much over 0° C.

After all of the two solutions has been added, the batch is stirred a while longer to insure complete reaction. The indophenol produced may be isolated in any known manner, as by salting out with common salt, the addition of the salt taking place rapidly.

Example 2.—A polysulphide solution is prepared from 500 parts water, 308 parts fused sodium sulphide (containing 60 per cent $Na_2S$) and 296 parts sulphur. In this solution at a temperature of about 50° C., there is dissolved 160 parts of the above prepared indophenol in the form of a paste. The polysulphide melt contains about 6.2 mols $Na_2S_5$ per mol of indophenol.

To the resulting solution, 61 parts $CuSO_4.5H_2O$ (0.65 mols) dissolved in 100 parts water is added. The reaction mass is heated under reflux at the boiling (about 108° C.) until reaction is complete, which requires about 19 hours. When the reaction is completed, the mass is diluted with about 3500 parts of water. To precipitate the dyestuff, the solution is saturated with salt, about 1150 parts being used, and a stream of air is blown through the solution. Precipitation is completed when a sample spotted on filter paper shows a circle of the dyestuff surrounded by a translucent olive to brown outrun. An opaque outrun indicates that precipitation is incomplete and aeration should be continued. The product is filtered off and dried.

The invention is not limited to the details of the above examples. In place of p-aminophenol, there may be used the corresponding proportions of o-chlor-p-aminophenol or other substituted p-aminophenols, and in place of phenyl-peri acid there may be used corresponding proportions of other arylaminonaphthalene mono-sulphonic acids, such as tolyl peri acid, or an arylaminonaphthalene-6-(or -7-) sulphonic acid, in which the aryl residue is free from substituents.

In the production of the indophenol, to secure the best yields the temperature should be maintained in the vicinity of 0° C., although a temperature slightly higher is permissible. Higher yields are obtained when the quantity of hypochlorite added to the reaction is maintained in slight excess over the p-aminophenol hydrochloride added. Lower yields are obtained when the hypochlorite and p-aminophenol solutions are simultaneously added in stoichimetrical proportions, or when the additon of hypochlorite is permitted to lag behind that of the p-amino-phenol. A hypochlorite solution is preferred as the oxidizing agent, although other oxidizing agents known to the art may be used.

The sulphuration is not limited to the details of the above examples. Any of the indophenols produced from the above mentioned arylaminonaphthalene sulphonic acids and p-aminophenols, or a derivative thereof, or the leuco indophenols, may be used. Polysulphides higher than $Na_2S_5$, as for example, $Na_2S_6$, may be used. The blueness of the dyeings may be offset to produce the desired shade by controlling the quantity of copper salt added. The reaction may be also carried out in the presence of alcohols or other organic liquids as solvents in place of water.

In the precipitation of the final dyestuff, the salt should be rapidly dissolved, before aeration begins, although the time of dissolution of the salt is a factor which may vary greatly without producing undesired results.

We claim:

1. In the production of a sulphur dye, the step which comprises heating an indophenol with a polysulphide, the sulphur content of which is higher than that represented by the formula $M_2S_4$ wherein M represents a metal, dissolving the finished polysulphide melt in water, and precipitating the dyestuff by saturating the solution with salt and aerating the resulting solution.

2. In the production of a sulphur dye, the step which comprises sulphurizing an indophenol of the following probable general formula

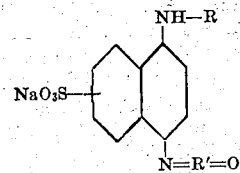

wherein R and R' represent aryl residues, with a polysulphide, the sulphur content of which is higher than that represented by the formula $Na_2S_4$.

3. In the production of a sulphur dye, the step which comprises sulphurizing an indophenol of the following probable general formula

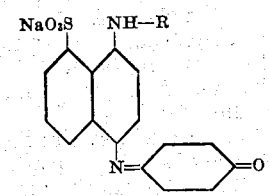

wherein R represents a phenyl or a homologous phenyl residue free from a substituent, with a polysulphide, the sulphur content of which is higher than that represented by the formula $Na_2S_4$.

4. In the production of a sulphur dye, the step which comprises sulphurizing an indophenol of the following probable formula

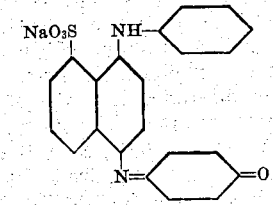

with a polysulphide having a sulphur content represented by the formula $Na_2S_5$.

5. In the production of a sulphur dye, the step which comprises heating an indophenol represented by the probable formula

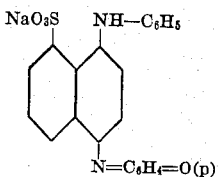

with 0.65 mols of a copper salt and 6.2 mols $Na_2S_5$.

6. In the production of a green sulphur dyestuff, the steps which comprise heating the indophenol represented by the formula

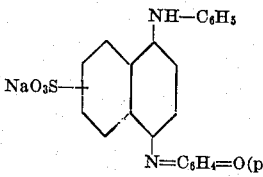

with an alkali metal polysulphide, the sulphur content of which is higher than that represented by the formula $M_2S_4$, wherein M represents an alkali metal.

7. In the production of a sulphur dyestuff, the steps which comprise heating an indophenol of the following formula

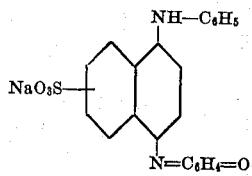

with an alkali metal polysulphide, the sulphur content of which is higher than that represented by the formula $M_2S_4$ wherein M represents an alkali metal, dissolving the resulting melt containing the dyestuff in water, saturating the solution with salt and aerating the resulting solution, to precipitate the dyestuff.

8. In the production of a green sulphur dyestuff, the steps which comprise heating an indophenol of the following formula

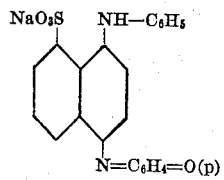

with a sodium polysulphide represented by the formula $Na_2S_5$, dissolving the resulting melt containing the dyestuff in water, and precipitating the dyestuff by saturating the solution with salt and aerating the resulting solution.

9. In the production of a sulphur dyestuff, the process which comprises reacting a p-aminophenol hydrochloride, an arylaminonaphthalene sulphonic acid, and hypochlorite, in alkaline medium to produce an indophenol, isolating the indophenol, heating the indophenol with an alkali metal polysulphide, dissolving the melt containing the dyestuff in water, and precipitating the dyestuff by saturating the solution with salt and aerating the resulting solution.

RAYMOND W. HESS.
MAURICE HENRY FLEYSHER.